June 1, 1948.  A. WICKESSER  2,442,630
RESISTANCE TRANSMITTER
Filed Sept. 24, 1945  2 Sheets-Sheet 1

INVENTOR.
ARTHUR WICKESSER
BY
Ernest H. Given
ATTORNEY

June 1, 1948.  A. WICKESSER  2,442,630
RESISTANCE TRANSMITTER
Filed Sept. 24, 1945  2 Sheets-Sheet 2
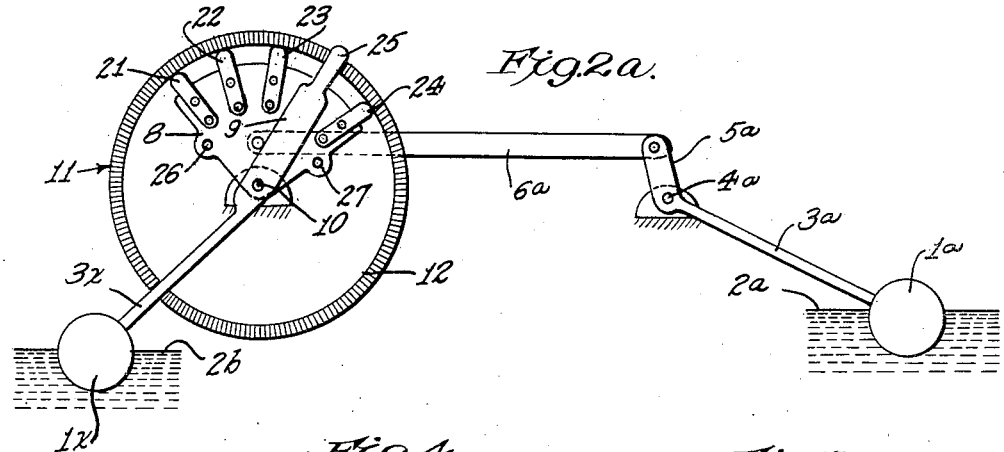
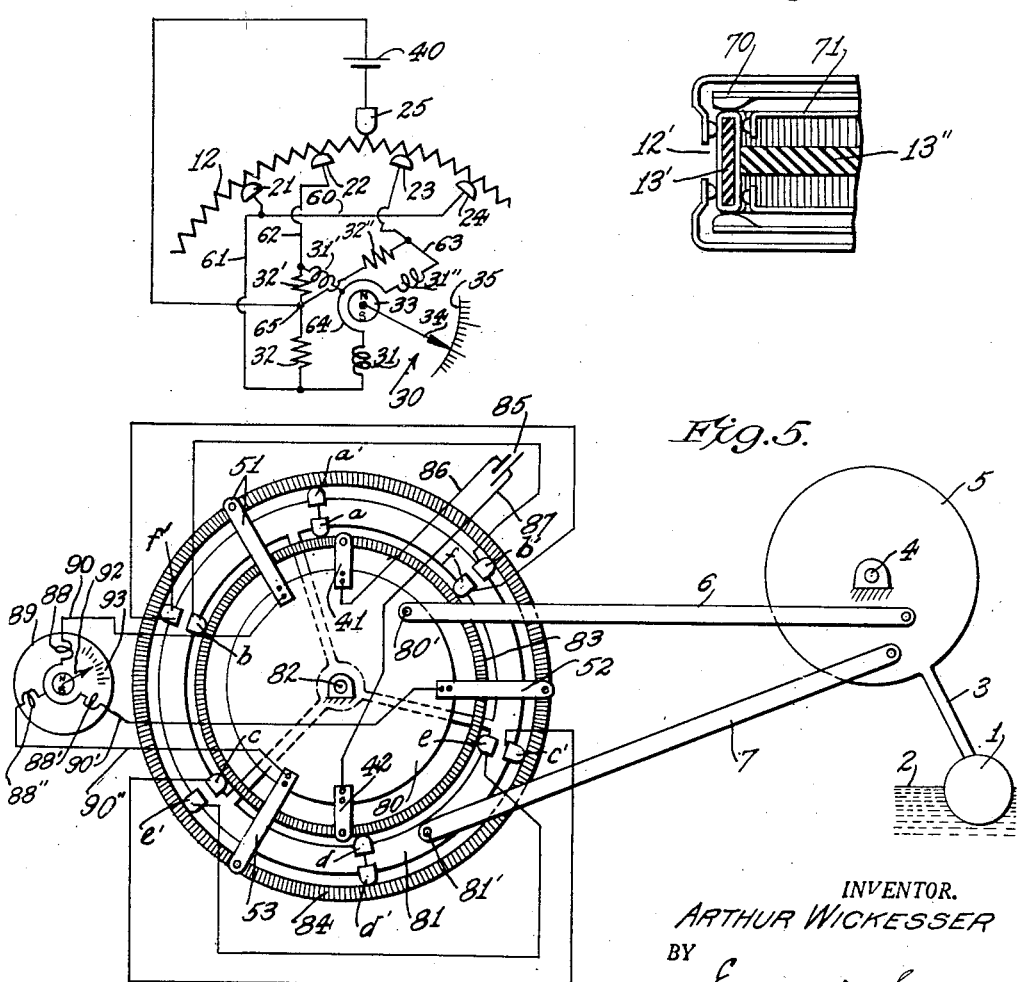
INVENTOR.
ARTHUR WICKESSER
BY
Ernest D. Given
ATTORNEY Patented June 1, 1948

2,442,630

UNITED STATES PATENT OFFICE 2,442,630

RESISTANCE TRANSMITTER

Arthur Wickesser, St. Albans, N. Y., assignor to The Liquidometer Corporation, Long Island City, N. Y., a corporation of Delaware Application September 24, 1945, Serial No. 618,242

16 Claims. (Cl. 201—48)

This invention relates to variable resistance means, particularly to variable resistance means for transmitters of measuring devices in which a transmitter including a variable resistance means controlled by a magnitude to be supervised transmits signals to a receiver controlled by the received signals.

Variable resistance means which comprise a resistance element and a plurality of contact elements engaging the resistance element are well known in the art, the relative position of the resistance element and the contact elements controlling the effective resistance value of the resistance means. This effective resistance value is then varied by changing the relative position of the resistance element and the contact elements.

One object of the invention is to provide a novel and improved variable resistance means in which a prime mover effecting a mechanical movement of the resistance element relative to the contact elements causes an amplified electric movement of the contact elements relative to the resistance element, thereby causing an amplified variation of the effective resistance value of the variable resistance means.

Another object of the invention is a novel and improved transmitter in which a prime mover assembly controlled by one or several magnitudes to be supervised controls the relative position of the resistance element and the contact elements in such a manner that a given mechanical movement of the prime mover or prime movers causes a corresponding but amplified electric movement of the contact elements relative to the resistance element.

Another object of the invention is to provide a novel means for controlling the scale characteristics of indicating means of a receiver of a measuring device of the type described, which control means permits parts of the scale to expand and to contract others according to a desired arrangement, or, in other words, the control means permits any desired scale characteristics.

Another object of the invention is a novel and improved transmitter capable of averaging and electrically amplifying the movements of a plurality of prime movers, each controlled by a magnitude to be measured, so that the signals transmitted by the transmitter correspond to a magnitude which is the average of the magnitudes controlling the prime movers.

Another object of the invention is to provide a novel transmitter capable of totaling the movement of a plurality of prime movers, each controlled by a magnitude to be measured, so that the signals transmitted by the transmitter correspond to a magnitude which is the total of the magnitudes controlling the prime movers.

Another object of the invention is a novel transmitter capable of taking the difference between the movements of a plurality of prime movers, each controlled by a magnitude to be supervised. The signals transmitted by the transmitter then correspond to a magnitude which is the difference between the supervised magnitudes controlling the prime movers.

Another object of the invention is a novel transmitter in which the variable resistance assembly is controlled by a linkage system rather than by the use of gears, a linkage system having been found superior for many purposes.

Transmitters according to the invention can be successfully employed in various fields. They are particularly advantageous for supervising liquid level changes in a tank.

Other and further objects, features and advantages of the invention will be hereinafter set forth and the novel features thereof defined by the appended claims.

In the accompanying drawings several embodiments of the invention are shown by way of illustration and not by way of limitation.

In the drawings:

Fig. 2a is a diagrammatic view of a variation of the linkage system of the transmitter shown in Fig. 2;

Fig. 3 is a diagrammatic partial view of a variable resistance assembly which may be used in conjunction with transmitters according to the invention;

Fig. 4 is a diagrammatic circuit system showing a transmitter according to the invention coacting with a conventional receiver, and Fig. 5 is a diagrammatic view of another modification of a transmitter according to the invention.

Figure 1:
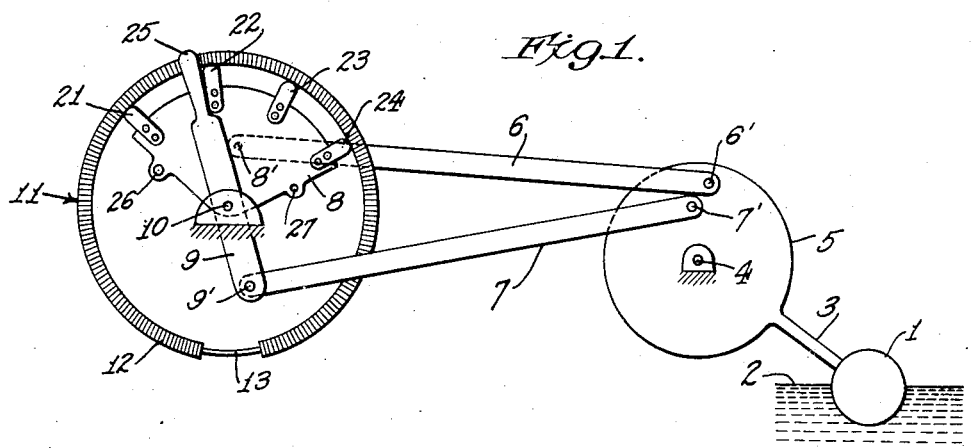
Fig. 1 is a diagrammatic view of a resistance transmitter according to the invention, one prime mover being provided to control the variable transmitter resistance.

Referring now to Fig. 1 in detail, the transmitter shown in Fig. 1 comprises a prime mover, such as a float 1, floating on a liquid, the changes in the level 2 of which are to be supervised. The liquid level may be the level of liquid in a tank such as a fuel tank of an airplane. Float 1 is supported by an arm 3 fastened to a disc 5 rotatable about a fixed pivot point 4. It should be understood that instead of a disc a lever may be provided. As will be apparent from the drawings a rise or fall of liquid level 2 will cause a corresponding angular displacement of disc 5. This disc is used to actuate connecting links 6 and 7 pivotally mounted on disc 5 by means of pivots 6' and 7' respectively. Link 6 drives a member 8 shown in the form of a sector, link 6 being pivoted to member 8 at pivot point 8'. Link 7 drives a member 9 shown as a two-arm lever, link 7 being pivoted to member 9 by a pivot 9'. Members 8 and 9 are pivoted on a common fixed pivot 10. The linkage system is arranged in such a manner that the distance between the pivot 4 and pivots 6', 7' is approximately proportional to the distance between pivot 10 and pivots 8', 9' respectively. As will be apparent from the drawings a rotation of disc 5 will cause a corresponding but opposite displacement of members 8 and 9. For instance, a clockwise rotation of float 1 due to a fall of liquid level 2 will cause a clockwise movement of member 8 and a counterclockwise movement of member 9.

Member 8 supports sliders 21, 22, 23 and 24 which may be equally spaced apart. Member 9 supports a slider 25. All sliders ride on a circular resistor, generally designated 11, and comprising a resistance wire 12 wound upon an insulation carrier 13. Resistor 11 is supported concentrically with the fixed pivot 10. As is apparent from the previous description an angular movement of disc 5 will cause a displacement of all the sliders relative to resistor 11 and also a displacement of slider 25 relative to sliders 21, 22, 23 and 24. Means are provided such as stops 26 and 27 to limit the movements of slider 25 relative to sliders 21, 22, 23, and 24 so that slider 25 does not pass beyond the limits defined by the outer sliders 21 and 24.

Instead of providing a circular resistor 11 as shown it is of course also possible to employ an arcuate resistor. Furthermore, the linkage system can be arranged so that float 1 will cause linear relative movements of sliders and resistor.

Assuming now that link 6 drives member 8 through an angular movement of about 60 degrees in clockwise direction due to a corresponding fall of liquid level 2 then simultaneously link 7 will drive member 9 through an angular movement of 60 degrees also but counterclockwise or in the opposite direction, the approximately equal angular movements of members 8 and 9 being obtained by the previously described mechanism composed of links 6 and 7 and the pivot arms formed between the various pivot points. As will now be seen disc 5 has made a mechanical movement of 60 degrees and each of members 8, 9 has also made a mechanical movement of 60 degrees. However, since the member movements are in opposite directions the slider 25 has been displaced relative to the sliders 21 to 24 on stationary resistor 11 by 120 electric degrees, or in other words the 60 degree mechanical movement of disc 5 has effected 120 degree electrical movement on the resistor. Consequently, the mechanical float movement is electrically doubled and correspondingly amplified.

In the previous description it has been assumed that the transmission ratio between mechanical movement and electrical movement is about 1:2. However, it should be noted that by connecting links 6 and 7 to disc 5 at pivot points different from the illustrated pivot points 6', 7' variations of the ratio of transmission of movement to members 8 and 9 in response to a given movement of disc 5 and therefore of liquid level 2 may be obtained. The same result can be obtained by varying the lengths of links 6 and 7 or the positions of pivot points 8' and 9', or, more generally, by varying the relationship of the various parts out of which the previously described 4-link mechanism is composed. The variations of the transmission ratio may be toward an increased ratio where higher accuracy of indicating the liquid level is desired or toward lower ratio where such lesser accuracy is sufficient. It has been found by practical tests that a wide range of variation may be obtained in this way. It will be obvious from the previous description that a variation of the mechanical transmission ratio between disc movement and member movement will also affect the transmission ratio between mechanical disc movement and electrical movement of the sliders relative to resistor 12 so that the amplification of the electrical movements can be conveniently adapted to the conditions of the particular case.

Figure 1A:
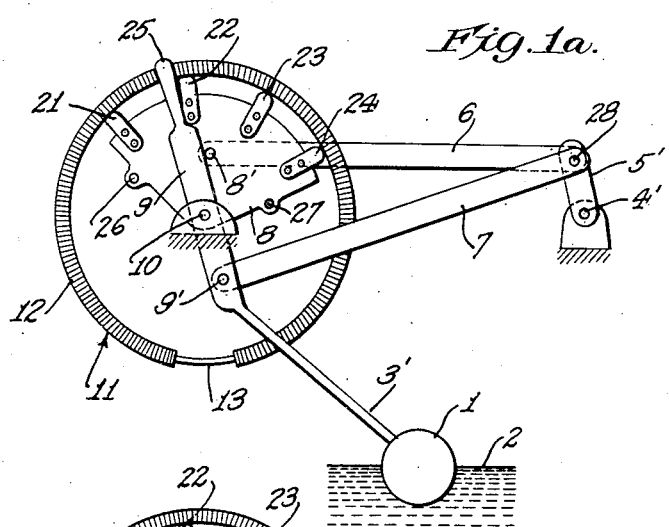
Fig. 1a is a diagrammatic view of a variation of the linkage system of the transmitter according to Fig. 1.

Fig. 1a shows a modification of the transmitter arrangement according to Fig. 1 in which float arm 3 is fastened directly to member 9. Links 6 and 7 are pivoted at a common pivot point 28 corresponding to pivot points 6', 7' of Fig. 1 to a lever 5' corresponding to disc 5. Lever 5' is pivotal about a fixed pivot point 4' corresponding to pivot 4.

The operation of the transmitter according to Fig. 1a will be obvious from the description of Fig. 1. A rise or fall of float 1 will turn member 9 in one direction and member 8 in the opposite direction. The ratio of transmission between the float movements and the member movements can again be controlled by selecting the lengths of the links and the locations of the pivot points accordingly.

The linkage system according to Fig. 1a in which the mechanism is driven from one of the members 8 or 9 has the advantage that the linkage mechanism has but one degree of freedom and driving either of members 8 or 9 will produce the desired movement.

The transmitters shown in Figs. 1 and 1a may be used in conjunction with any suitable and conventional receiving means.

Fig. 4 illustrates one of the numerous practical circuit systems which may be used. The same numerals are employed as were used in other figures to designate corresponding parts.

As will appear from Fig. 4 sliders 21 and 24 are connected together by a lead 60 and by a common lead 61 to one end of a coil 31 of a ratiometer generally designated 30. Sliders 22 and 23 are connected by leads 62 and 63 respectively to ratiometer coils 31' and 31''. The three coils are joined at their remaining free ends by a common lead 64. Three resistors 32, 32', and 32'' are connected to the three outer coil ends and also joined at their free ends at a point 65. A source of current such as a battery 40 is connected between slider 25 and the joining point 65. This circuit permits the coils to furnish magnetic fields which influence the angular position of a permanent magnetic rotor 33 which pivots on a central shaft and moves a pointer 34 in relation to a stationary scale 35. It will now be apparent that the previously explained movement of slider 25 relative to sliders 21 to 24 will vary the resistance values included in the coil circuits and hence change the magnetic fields in the coils in relation to each other thereby rotating pointer 34 correspondingly. Scale 35 may be calibrated in units of the magnitude to be measured, for instance, in gallons of liquid.

Due to the amplification of the electrical movements of the sliders on the resistor a comparatively slight float movement will result in a substantial pointer movement thereby permitting a high accuracy of indication. Furthermore, certain parts of the scale may be extended and others may be contracted according to a desired scale. This possibility is inherent in the operation of a mechanism such as described, since such mechanism has a varying transmission ratio, at different positions of the component members, which may be adapted to a particular application by a proper selection of the lengths of the links and of the pivot locations.

It will be obvious that a movement of the resistor itself relative to all the sliders will have no influence on the pointer movement provided the resistor is uniformly wound. Also a uniform movement of all the sliders relative to the resistor will have no influence on the pointer movement.

Figure 2:
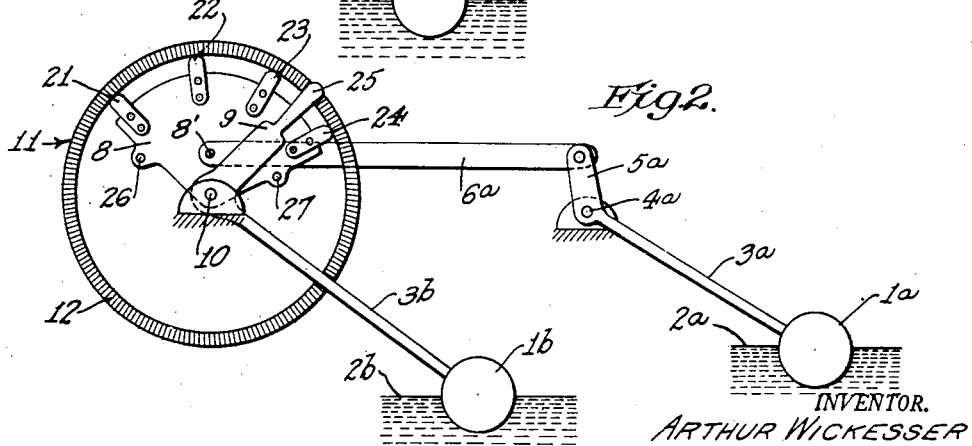
Fig. 2 is a modification of a resistance transmitter according to the invention, the variable resistance being controlled by two prime movers.

Fig. 2 describes a transmitter according to the invention in which members 8 and 9 supporting the respective sliders are operated by two independent prime movers. One prime mover drives a link 6a and comprises a float 1a floating on a liquid level 2a and rotating an arm 3a about a fixed pivot point 4a. Arm 3a is fastened to an arm 5a which in turn is pivoted to the driven link 6a. The second prime mover comprises a float 1b floating on a second liquid level 2b and rotates an arm 3b which is directly fastened to member 9. Lever 5a is so arranged as to permit link 6a to remain always parallel to the line through fixed pivots 10 and 4a thereby forming a parallelogram or pantograph linkage. As a result the angular movement of member 8 will be substantially identical with the rotation of arm 3a. Similarly the rotation of member 9 will be substantially identical with the rotation of arm 3b. It will now be apparent that a rise or fall of both liquid levels to an equal extent will move both sets of sliders equally relative to each other and thereby the sliders will have no influence on a circuit system such as shown in Fig. 4. A ratiometer circuit according to Fig. 4 will respond only to differences between the liquid level changes. Consequently, the transmitter according to Fig. 2 is capable of indicating differences between the liquid levels 2a and 2b.

By a simple modification of the arrangement shown in Fig. 2 the rotation of member 9 in response to a rise or fall of liquid level can be reversed. As a result a relative movement between the sliders is obtained which is dependent upon the sum of changes in the liquid levels rather than upon their differences. Thus a circuit system connected to such a transmitter will indicate the sum of the contents of the liquid in two tanks or it may indicate the average position of two liquid levels.

Fig. 2a shows such modification. As there shown, a float 1x floating on liquid level 2b rotates an arm 3x rigid with member 9. The position of float 1x and its arm 3x relative to member 9 is so selected that a change of liquid level 2b, for instance a rise, will now cause a movement of member 9 in clockwise direction, whereas a rise of liquid level 2b in Fig. 2 will cause a movement of member 9 in counterclockwise direction. A rise of liquid level 2a will cause a movement of member 8 in counterclockwise direction in both the arrangements shown in Figs. 2 and 2a.

By varying the link dimensions and relative angles in the transmitters shown in Figs. 2 and 2a, the changes of one liquid level may be weighted more or less than the changes in the second liquid level whereby the indications of the ratiometer can be conveniently adapted to the conditions of a particular case.

As has been previously described, slider 25 is fastened to member 9 and sliders 21 to 24 are fastened to member 8, and slider 25 is driven in an opposite direction to the other sliders. Consequently the structural arrangement must be designed in such a manner that interference between the sliders is avoided. Various structural arrangements of this kind may be provided. Fig. 3 shows a practical arrangement for that purpose. As there shown a resistance wire 12' is wound on an insulation carrier 13' supported on an insulation disc 13''. A slider 70 which may correspond to slider 25 is mounted for riding on the upper edge of resistance wire 12'. Slider 71 which corresponds to any one of the sliders 21 to 24 is supported for slidable engagement of the inner surface of resistance wire 12'. Since Fig. 3 shows a cross-section, only one of the last mentioned set of sliders is viewable but it will be understood that all sliders represented by the illustrated slider 71 will be arranged in the same path or track. It will be further understood that sliders such as slider 71 may move opposite to slider 70 without interference. It is, of course, also possible to arrange sliders such as slider 71 in engagement with the opposite edge of the resistance wire, slider 70 being then mounted in engagement with the inner surface of the resistance wire. Fig. 3 shows a number of additional sliders which do not correspond to sliders of the transmitters shown in the previous discussed figures but are illustrated in order to indicate that the slider sets can be arranged in various positions in which they may move in opposite directions and at a different rate without interference. It will be further understood that the invention is not limited to the use of four sliders in one set and one slider in the other set but the number of sliders required in each set will be determined by the receiver circuit system controlled by the transmitter.

In the previous description, transmitters have been described in which the mechanical float movements cause approximately doubled electrical movements on the transmitter resistance. Fig. 5 shows a transmitter modification according to the invention in which a mechanical prime mover movement effects an approximately quadrupled electrical movement on the transmitter resistor.

According to the transmitter shown in Fig. 5, links 6 and 7 are driven in opposite directions by a prime mover such as has been shown in Fig. 1. The same numerals are therefore used to designate corresponding parts. Link 6 is pivoted at a pivot point 80' to an insulation disc 80 and link 7 is pivoted at a pivot point 81' to a ring shaped insulation member 81. Both members 80 and 81 are rotatably supported on a common pivot 82. As will be seen from Fig. 5, a rotation of disc 5 causes a corresponding rotation of disc 80 in one direction and of ring 81 in the opposite direction. Disc 80 carries sliding contacts 41, 42 which ride on a circular resistor 83 and also sliding contacts 51, 52 and 53 which ride upon a second circular resistor 84. Resistors 83 and 84 are stationary and mounted concentric with disc 80 and ring 81. Ring 81 carries sliding contacts designated $a, b, c, d, e, f$, riding upon resistor 83 and a second set of sliding contacts, designated $a', b', c', d', e'$ and $f'$, riding upon resistor 84. Slider $a$ is connected to slider $a'$; slider $b$ to slider $b'$, etc., as shown in Fig. 5. Sliders $a, b, c, d, e, f$ are arranged in counterclockwise sequence on resistor 83 and sliders $a', b', c', d', e', f'$ in clockwise sequence on resistor 84.

The sliders carried by ring 81 do not require any wiring in addition to the interconnections of the sliders since these sliders are employed only to make connections between varying points of both resistors 83 and 84.

The sliders carried by disc 80 are connected to the circuit system of a suitable receiver. For purpose of illustration, a standard D.-C. Selsyn type system has been shown. This system comprises a source of current such as a battery 85 connected between sliding contacts 41 and 42 by leads 86 and 87 respectively. The three coils 88, 88' and 88" of a ratiometer, generally designated 89, are symmetrically connected to sliders 51, 52 and 53 by leads 90, 90', 90" respectively, the remaining ends of the coils being joined. The magnetic fields created by the coils act upon a permanent magnet rotor 91 mounted symmetrically relative to the coils. This rotor revolves on a center shaft and moves a pointer 92 in relation to a stationary scale 93 calibrated, for instance, in gallons in liquid.

The mechanism is again arranged to be operated as a pantograph system.

The operation of a transmitter according to Fig. 5 is as follows:

An examination of the circuit shows that it is related to a standard D.-C. Selsyn type circuit except that the single ring type resistance element usually employed in such circuits has been replaced by two resistance elements which are connected in parallel with each other at many points, six in the illustration. Because of these many interconnections, the two resistance elements may be considered without substantial error as a single resistance element of lowered resistance.

Let it be assumed that liquid level 2 and hence float 1 falls a small amount from the position shown. As a result of this fall disc 80 is caused to rotate counterclockwise through an angle A and ring 81 is caused to rotate clockwise through an angle B. In general angle A is not equal to angle B but will often be approximately equal to angle B. On resistor 83, the two angular movements A and B will be in opposite directions so that their electrical influence as to the resistance values affecting the ratiometer coils is additive. In other words, the opposite movements A and B will result in a total electrical movement corresponding to an angle A+B in such direction as to move sliders 41 and 42 in the direction of a contact sequence $a, b, c$. Similarly on resistor 84 the two angular movements A and B are in opposite directions and therefore additive. Consequently, the last mentioned movements will also result in a total electrical movement corresponding to an angle A+B in such direction as to move sliders 51, 52, 53 in the direction of contact sequence $a', f'$. Since this direction $a', f'$ is opposite electrically to the direction $a, b, c$ it is apparent that the movement of sliders 41, 42 is electrically opposite to the movement of sliders 51, 52, 53 and since both movements are of equal magnitude, to wit A+B, the total electrical movement corresponds to 2(A+B) or approximately 4A, if A is substantially equal to B. Hence the electrical movement of a slider such as 41 relative to a slider such as 51 is about four times as great as the mechanical movement of disc 5 and also about four times as great as would be obtained by a conventional single slider sliding on a conventional resistance element in response to a float movement, such amplification being obtained without the use of gearing and by a comparatively simple linkage system.

In the system shown in Fig. 5, a movement of the float which rotates disc 80 and ring 81 through approximately 90° each, for example, will have the effect of a 360 degree electrical rotation and will cause the pointer 92 of the ratiometer 89 also to move through 360 degrees. The amount of float movement which can cause a mechanical rotation of disc 80 and ring 81 through 90 degrees may be quite small by selecting suitable link dimensions and pivot locations.

In the previous description, insulation ring 81 has been described as carrying interconnected slider contacts riding upon stationary resistance elements 83 and 84. It was also pointed out that since the resistance elements are uniformly wound, they may be given a movement also, without influencing the operation in any way. For example, they might be given the same movement as ring 81, so that the slider contacts on ring 81 no longer slide upon resistance elements 83 and 84 but remain in stationary contact with them. Thus, without in any way changing or modifying the circuit operation, slider contacts $a, b, c, d, e, f$, and $a', b', c', d', e', f'$ may become soldered connections, provided only that the resistance elements 83 and 84 become fastened to ring 81 instead of remaining stationary.

In the previous figures duplication and quadruplication of a mechanical movement in response to a change of a magnitude such as a liquid level to be supervised have been described, but it will be understood that the invention is not limited to such amplification but a much higher amplification may be conveniently obtained by providing a greater number of resistors and sliders which are displaced relative to each other and also relative to the resistors.

While the invention has been described with respect to certain particular preferred examples and embodiments it will be understood by those skilled in the art after understanding the invention, that various changes and modifications may be made without departing from the spirit and scope of the invention, and it is intended, therefore, in the appended claims to cover all such changes and modifications.

What is claimed is:

1. A variable resistance means comprising two resistance elements interconnected in opposite parallel connection, two movably supported contact elements each engaging one of the resistance elements, a prime mover assembly, and a linkage system actuated by the prime mover assembly for moving the contact elements relative to the respective resistance elements and in opposite directions corresponding to a movement of the prime mover assembly thereby causing an amplified electric movement of the contact elements relative to the resistance elements in response to a mechanical movement of the prime mover assembly.

2. A variable resistance means comprising two resistance elements, two sets of sliding contacts, each set engaging one of the resistance elements, the individual contacts of said two sets being electrically interconnected for connecting sections of the two resistance elements in opposite parallel connection, two contact elements each engaging one of the resistance elements, a movable member supporting said two sets of contacts and one of the contact elements, a second movable member supporting the other contact element, a prime mover assembly, and a linkage system actuated by the prime mover assembly for moving the sliding contacts and the contact elements relative to the respective resistance elements and in opposite directions corresponding to a movement of the prime mover assembly, thereby causing an amplified electric movement of the contact elements and the contacts relative to the resistance elements in response to a mechanical movement of the prime mover assembly.

3. A variable resistance means comprising two resistance elements, two sets of sliding contacts, each set engaging one of the resistance elements, the individual contacts of said two sets being electrically interconnected for connecting sections of the two resistance elements in opposite parallel connection, two contact elements each engaging one of the resistance elements, a movable member supporting said two sets of contacts and one of the contact elements, a second movable member supporting the other contact element, a prime mover assembly, and a linkage system actuated by the prime mover assembly, said linkage system comprising a link operatively coupling the prime mover assembly with one of the movable members and a second link operatively coupling the prime mover assembly with the other movable member, said links being arranged to displace the movable members and hence the sliding contacts and the contact elements supported thereby in opposite directions relative to each other, thereby causing an amplified electric movement of the contact elements and the sliding contacts relative to the resistance elements in response to a mechanical movement of the prime mover assembly.

4. In a transmitter for a measuring device of the type described, the combination of two resistance elements interconnected in opposite parallel connection, two movably supported contact elements each engaging one of the resistance elements, a prime mover assembly controlled by a magnitude to be supervised, and a linkage system actuated by the prime mover assembly for moving the contact elements relative to the respective resistance elements and in opposite direction corresponding to a movement of the prime mover assembly caused by a change of the magnitude to be supervised.

5. A resistance type transmitter comprising two resistance elements, two sets of sliding contacts, each set engaging one of the resistance elements, the individual contacts of the two sets being electrically interconnected for connecting sections of the two resistance elements in opposite parallel connection, two sets of contact elements, each set of contact elements engaging one of the resistance elements, a movable member supporting said two sets of sliding contacts and one set of the contact elements, a second movable member supporting the other contact element, a prime mover assembly controlled by the change of the magnitude to be supervised, and a linkage system actuated by the prime mover assembly for moving the movable members and hence the contact elements and sliding contacts supported thereby in opposite direction corresponding to a movement of the prime mover assembly in one direction.

6. A variable resistor comprising resistance means, two contact elements engaging the resistance means, a prime mover assembly, and a linkage operatively coupled with the contact elements and actuated by the prime mover assembly, said linkage system being arranged to displace the contact elements relative to the resistance means and in opposite direction when actuated.

7. A variable resistor comprising resistance means, two movably supported contact elements engaging the resistance means, a prime mover assembly, and a linkage system actuated by the prime mover assembly, said linkage system comprising a link operatively coupling the prime mover assembly with one of the contact elements and a second link operatively coupling the prime mover assembly with the other contact element, said links being arranged to displace the contact elements relative to the resistance means and in opposite direction.

8. A variable resistor comprising resistance means, two contact elements engaging the resistance means, a movably mounted member for supporting one of the contact elements, a second movably mounted member for supporting the other contact element, a prime mover assembly, a linkage operatively coupled with one of the members, and a second linkage operatively coupled with the other member, said prime mover assembly being arranged to impart movement to the two linkages in opposite direction for displacing said contact elements relative to the resistance means and in opposite direction to each other.

9. A variable resistor comprising an arcuate resistance means, two contact elements rotatably supported concentrically with the arcuate resistance means and engaging the resistance means, a prime mover assembly, and a linkage system actuated by the prime mover assembly, said linkage system comprising a link operatively coupling the prime mover assembly with one of the contact elements and a second link operatively coupling the prime mover assembly with the other contact element, said links being arranged to rotate the contact elements on the arcuate resistance means and in opposite direction when actuated.

10. A variable resistor comprising resistance means, a contact element engaging the resistance means and mounted for movement thereon, a second contact element engaging the resistance means and mounted for movement thereon along a path other than the path of the first contact element, a prime mover assembly, and a linkage system actuated by the prime mover assembly, said linkage system comprising a link operatively coupling the prime mover assembly with one contact element and a second link operatively coupling the prime mover assembly with the other contact element, said links being arranged to displace the contact elements relative to the resistance means and in opposite direction when actuated.

11. A variable resistor comprising resistance means, a contact element engaging the resistance means, a prime mover, a linkage operatively coupled with the contact element and the prime mover for displacing the contact element on the resistance means corresponding to a prime mover movement, a second contact element engaging the resistance means, a second prime mover, and a second linkage operatively coupled with the second contact element and the second prime mover for displacing the second contact element on the resistance means corresponding to a movement of the second prime mover.

12. In a transmitter for a measuring device of the type described, the combination of a resistance element, two movably supported contact elements engaging the resistance element, a prime mover assembly controlled by a change of a magnitude to be supervised, and a linkage system actuated by the prime mover assembly, said linkage system comprising a link operatively coupling the prime mover assembly with one of the contact elements and a second link operatively coupling the prime mover assembly with the other contact element, said links being arranged to displace the contact elements relative to the resistance element and in opposite direction, thereby causing an electric movement of the contact elements on the resistance elements amplified in relation to the prime mover assembly movement.

13. In a transmitter for a measuring device of the type described, the combination of a resistance element, a movably supported contact element engaging the resistance element, a prime mover controlled by a magnitude to be supervised, a linkage operatively coupled with the contact element and the prime mover for displacing the contact element on the resistance element corresponding to a prime mover movement, a second movably supported contact element engaging the resistance element, a second prime mover controlled by a second magnitude to be supervised, and a second linkage operatively coupled with the second contact element and the second prime mover for displacing the second contact element on the resistance element corresponding to a movement of the second prime mover, thereby causing an electric movement of the contact elements relative to the resistance element corresponding to both magnitudes to be supervised.

14. A variable resistance means comprising two resistance elements connected in opposite parallel connection, two movably supported contact elements each engaging one of the resistance elements, a prime mover assembly, and a linkage system actuated by the prime mover assembly for moving the contact elements relative to the respective resistance elements in response to a prime mover assembly movement, thereby causing an amplified electric movement of the contact elements relative to the resistance elements in response to a mechanical movement of the prime mover assembly.

15. A variable resistance means comprising two resistance elements, a plurality of electric connections between the resistance elements for interconnecting sections of the resistance elements in opposite parallel connection, two movably supported contact elements each engaging one of the resistance elements, a prime mover assembly, and a linkage system actuated by the prime mover assembly for moving the contact elements relative to the respective resistance elements in response to a prime mover assembly movement, thereby causing an amplified electric movement of the contact elements relative to the resistance elements in response to a mechanical movement of the prime mover assembly.

16. In a transmitter for a measuring device of the type described, the combination of two resistance elements, a plurality of electric connections between the resistance elements for interconnecting sections of the resistance elements in opposite parallel connection, two movably supported contact elements each engaging one of the resistance elements, a prime mover assembly controlled by a magnitude to be supervised, and a linkage system actuated by the prime mover assembly for moving the contact elements relative to the respective resistance elements in response to a prime mover assembly movement, thereby causing an amplified electric movement of the contact elements relative to the resistance elements in response to a mechanical movement of the prime mover assembly caused by a change of the magnitude to be supervised.

ARTHUR WICKESSER.

REFERENCES CITED

The following references are of record in the file of this patent:

UNITED STATES PATENTS

| Number | Name | Date |
| --- | --- | --- |
| 2,391,053 | Lingel | Dec. 18, 1945 |
| 2,396,244 | Borsum | May 12, 1946 |